(12) United States Patent
Takahashi

(10) Patent No.: US 7,538,792 B2
(45) Date of Patent: May 26, 2009

(54) DIGITAL CAMERA AND CRADLE ON WHICH THE DIGITAL CAMERA IS MOUNTED

(75) Inventor: Kimihide Takahashi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 603 days.

(21) Appl. No.: 10/601,530

(22) Filed: Jun. 24, 2003

(65) Prior Publication Data

US 2004/0004671 A1    Jan. 8, 2004

(30) Foreign Application Priority Data

Jun. 25, 2002 (JP) ............................. 2002-183789
Apr. 9, 2003 (JP) ............................. 2003-104965

(51) Int. Cl.
*H04N 5/225* (2006.01)

(52) U.S. Cl. .................................... 348/207.1; 348/373

(58) Field of Classification Search ................. 348/373, 348/375, 374, 333.06, 207.11, 207.1, 372, 348/376; 396/428, 419, 300; 455/556.2, 455/556.1, 557, 561; 358/906
See application file for complete search history.

(56) References Cited

U.S. PATENT DOCUMENTS 5,374,971 A * 12/1994 Clapp et al. ................. 348/376

| | | | | |
|---|---|---|---|---|
| 5,452,180 A * | 9/1995 | Register et al. | ............. | 361/686 |
| 5,550,588 A * | 8/1996 | Hayashi | ................. | 348/231.99 |
| 5,734,414 A * | 3/1998 | Nishimura et al. | ........ | 348/14.05 |
| 5,966,164 A * | 10/1999 | Gotoh et al. | ............. | 348/14.01 |
| 6,081,422 A * | 6/2000 | Ganthier et al. | ............. | 361/686 |
| 6,572,282 B1 * | 6/2003 | Okuley et al. | ................ | 396/428 |
| 6,734,915 B2 * | 5/2004 | Nagaoka | ...................... | 348/375 |
| 6,812,971 B2 * | 11/2004 | Terane | ......................... | 348/375 |
| 7,167,207 B2 * | 1/2007 | Kawaguchi et al. | ......... | 348/375 |
| 7,170,557 B2 * | 1/2007 | Manico et al. | ......... | 348/333.07 |
| 7,301,561 B2 * | 11/2007 | Ohmura | .................... | 348/207.1 |
| 2002/0093583 A1 | 7/2002 | Ito | | |
| 2002/0176006 A1 * | 11/2002 | Miura | .................... | 348/211.99 |
| 2004/0201774 A1 * | 10/2004 | Gennetten | .................... | 348/375 |

* cited by examiner

*Primary Examiner*—Justin P Misleh
(74) *Attorney, Agent, or Firm*—Sughrue Mion, PLLC

(57) ABSTRACT

A digital camera is mounted on a camera mounting unit of a cradle, and supported as swayable. When the digital camera is tilted forward, a front switch is turned on, and a command to change into a storage mode is issued from a switch determination circuit to the digital camera. When the digital camera is tilted backward, a back switch is turned on, and a command to change into a PC camera mode is issued from the switch determination circuit to the digital camera.

3 Claims, 15 Drawing Sheets

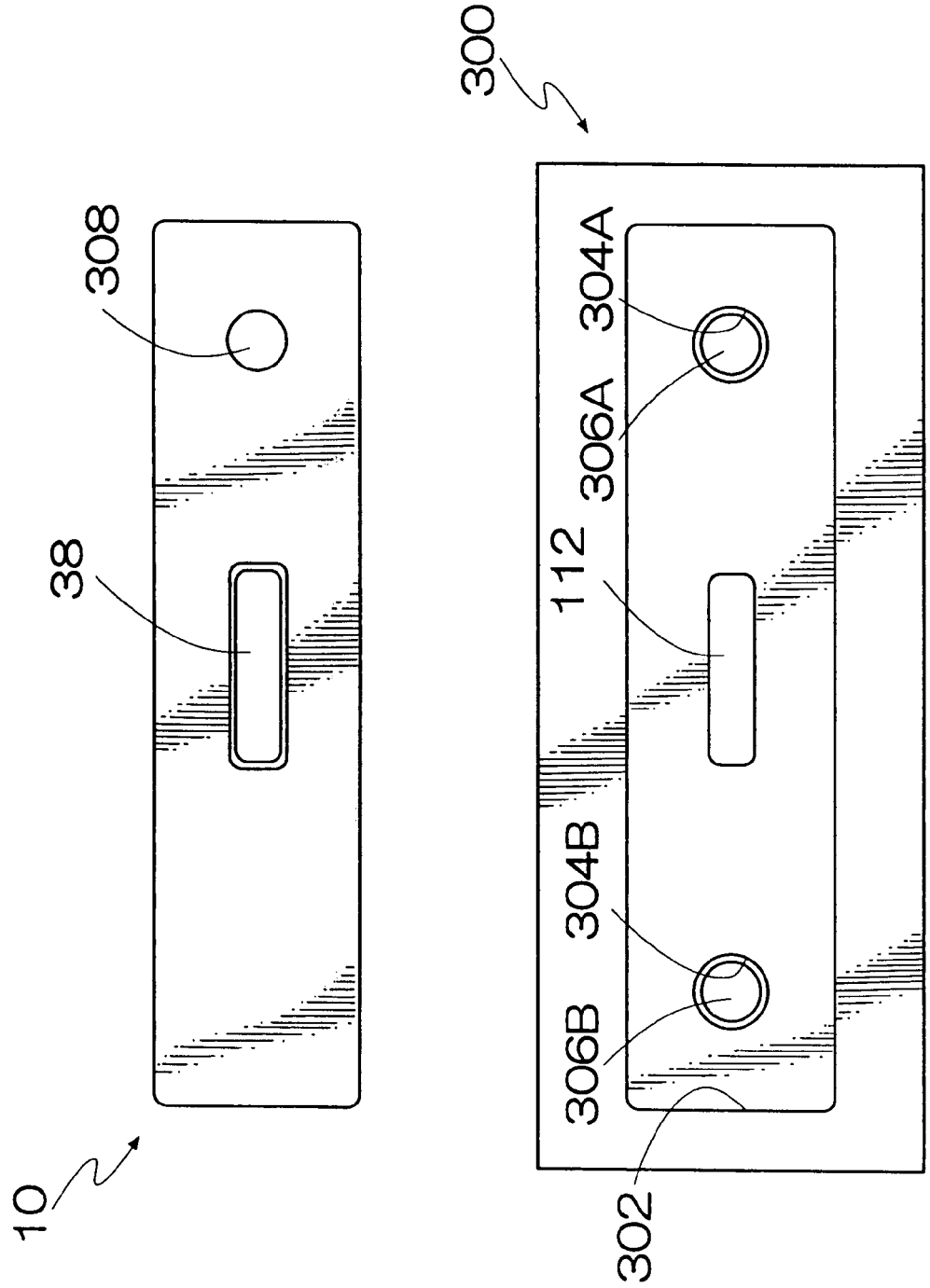

DIGITAL CAMERA AND CRADLE ON WHICH THE DIGITAL CAMERA IS MOUNTED

BACKGROUND OF THE INVENTION

1. Field of the Invention

The present invention relates to a digital camera system, and more specifically to a digital camera system in which a digital camera is connected to external equipment such as a personal computer via a cradle.

2. Description of the Related Art

A digital camera can be connected to a personal computer so that a shot image data can be fetched to the personal computer.

Generally, a cable is used in connecting a personal computer to a digital camera. However, a connection using a cable is a troublesome and laborious job.

Accordingly, a camera system of connecting a digital camera to a personal computer using a cradle is proposed to simplify the job of connecting a personal computer to a digital camera. The system enables a digital camera to be connected to a personal computer by mounting the digital camera on a cradle connected to the personal computer through a cable.

Recently, a digital camera has been operated generally in the two communications modes with a personal computer, that is, a storage mode in which the digital camera functions as a card reader, and a PC camera mode in which the digital camera functions as a PC camera. In the storage mode, image data recorded on a memory card is appropriately read and transmitted to the personal computer. In the PC camera mode, motion picture data currently being captured is continuously transmitted to the personal computer so that a video conference, etc. can be realized.

However, in the camera system using a conventional cradle, the mode in which communications are established with a personal computer is set on the camera side. Therefore, the digital camera is to be mounted on the cradle after setting the communications mode, thereby causing low operability. Furthermore, there has been the problem that the settings of the current communications mode cannot be obtained until the settings on the camera side are checked.

SUMMARY OF THE INVENTION

The present invention has been developed to solve the above-mentioned problems, and aims at providing a high-operability digital camera system.

In order to attain the above-mentioned objects, the present invention is directed to a digital camera system comprising a digital camera and a cradle on which the digital camera is mounted, wherein: the cradle comprises: a movable portion; a signal generating device which generates a command signal for changing functions of the digital camera according to a position of the movable portion; and a signal transmitting device which transmits the command signal generated by the signal generating device to the digital camera; and the digital camera comprises: a signal receiving device which receives the command signal generated according to the position of the movable portion of the cradle; and a mode control device which changes operation modes of the digital camera according to the command signal transmitted from the cradle.

According to the present invention, when the movable portion of the cradle is moved, the position of the movable portion is determined, and a command signal is generated according to the position of the movable portion. The command signal is transmitted to the digital camera mounted on the cradle, and the operation modes (that is, the functions) of the digital camera are switched according to the command signal, thereby eliminating the need for the troublesome setting operations and improving the operability.

The term "digital camera" designates an electronic image-capturing device having the function of converting an optical image of a subject into image data obviously including those belonging to a product group of "cameras" such as a digital sill camera, a digital video camera, etc., and further including the equipment having the practically similar functions such as a mobile phone with a camera, a PDA with a camera, a mobile personal computer with a camera, etc. nevertheless which do not belong to the above-mentioned product group of the cameras.

According to an aspect of the cradle in the camera system of the present invention, the movable portion comprises a camera mounting unit on which the digital camera is mounted. In this aspect, the camera mounting unit can be moved together with the digital camera with the digital camera mounted on the camera mounting unit of the cradle.

The cradle in another aspect further comprises: a leg portion which supports the camera mounting unit, wherein the camera mounting unit is coupled to the leg portion through a movable system.

In this case, according to a further aspect, the movable system enables the camera mounting unit to move relatively to the leg portion, and a moving style of the camera mounting unit includes at least one of tilting, sliding, rotating, and vertical moving with respect to the leg portion.

It is preferable that the movable system enables the movable portion to move in a predetermined moving range. The stopping position of the movable portion depends on the types of the operation modes that can be switched on the digital camera side. When two types of modes are switched, at least two stopping positions are set in the moving range.

A further aspect of the cradle of the present invention comprises: a communications interface for connection and communications with external equipment, wherein the digital camera is connected to communicate with the external equipment through the cradle by mounting the digital camera on the cradle.

In this case, it is preferable that the signal generating device generates a signal for switching functions of the digital camera for the external equipment connected for communications through the cradle.

According to an aspect of a digital camera used in the camera system of the present invention, the operation modes are changed according to the command signal while the digital camera is mounted on the cradle and powered up.

Furthermore, the digital camera according to another aspect of the present invention comprises a charge control device which, when the digital camera is mounted on the cradle with the digital camera being powered down, automatically sets a charge mode where a battery in the digital camera is charged by power supplied through the cradle.

In order to attain the above-mentioned objects, the present invention is also directed to a digital camera system in which a digital camera is connected to communicate with external equipment when the camera is mounted on a cradle, wherein the cradle comprises: a tilt angle changing device which changes a tilt angle of the digital camera mounted on the cradle; a determination device which determines a change in the tilt angle of the digital camera by the tilt angle changing device; and a command device which outputs a function change signal to the digital camera according to a determination result of the determination device, wherein the digital camera changes functions for the external equipment according to the function change signal received from the command device.

According to the present invention, the functions of the digital camera can be switched for the external equipment according to the tilt angle of the digital camera mounted on the cradle. Thus, laborious setting operations are eliminated, and the operability can be improved. Additionally, according to the tilt angle of the digital camera mounted on the cradle, the current settings can be immediately checked.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 9 is a bottom view of the digital camera and the plane view of the cradle according to the second embodiment of the present invention;

DETAILED DESCRIPTION OF THE PREFERRED EMBODIMENTS

The preferred embodiments of the digital camera system according to the present invention are described below by referring to the attached drawings.

Figure 1:
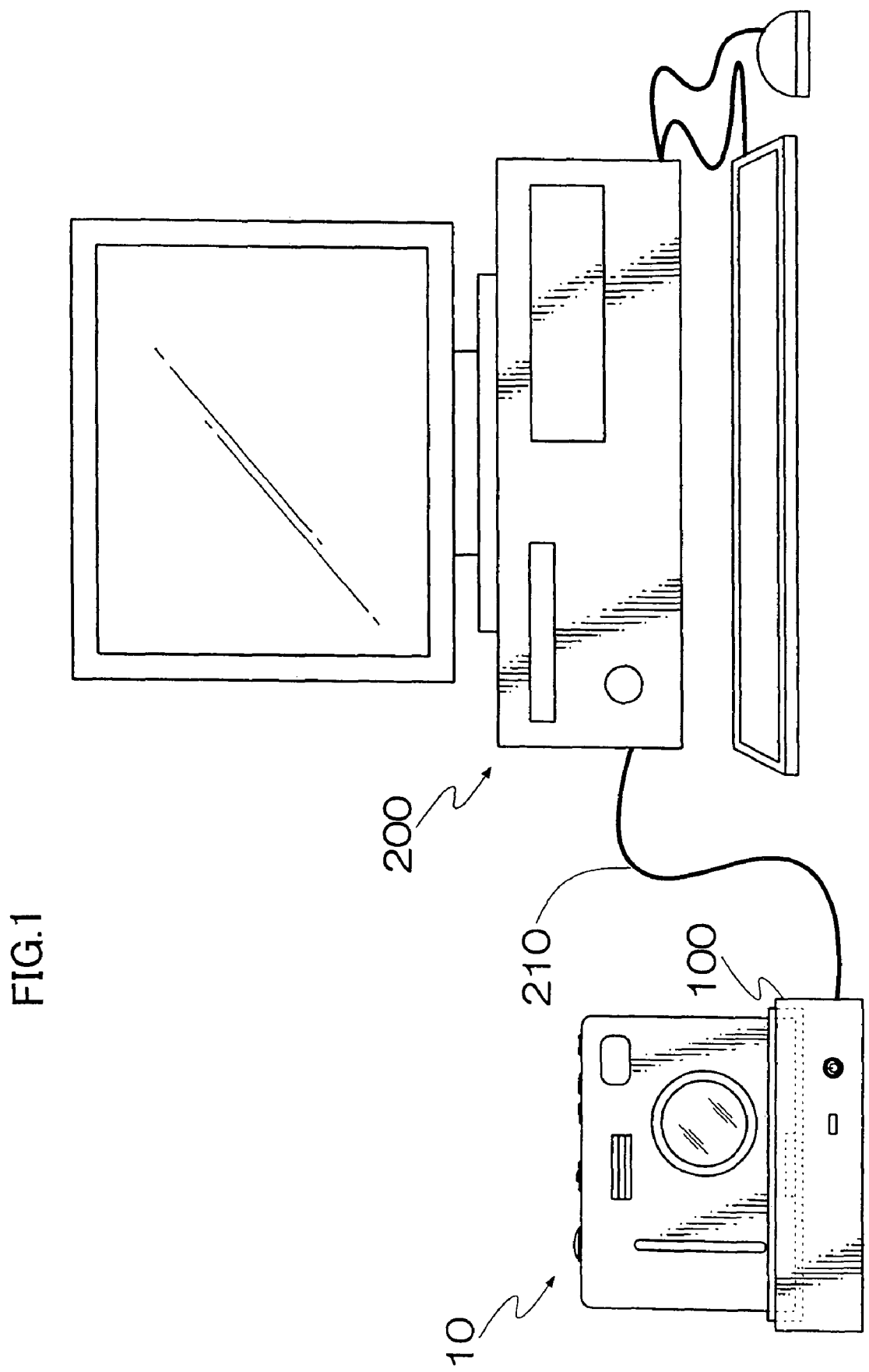
FIG. 1 is a perspective view showing the first embodiment of the digital camera system according to the present invention.

FIG. 1 is a perspective view showing the first embodiment of the digital camera system according to the present invention. As shown in FIG. 1, the digital camera system according to the present embodiment is configured by a digital camera 10 and a cradle 100. The cradle 100 is connected to a personal computer 200 through a communications cable (USB cable in the present embodiment) 210 for bidirectional communications.

Figure 2:
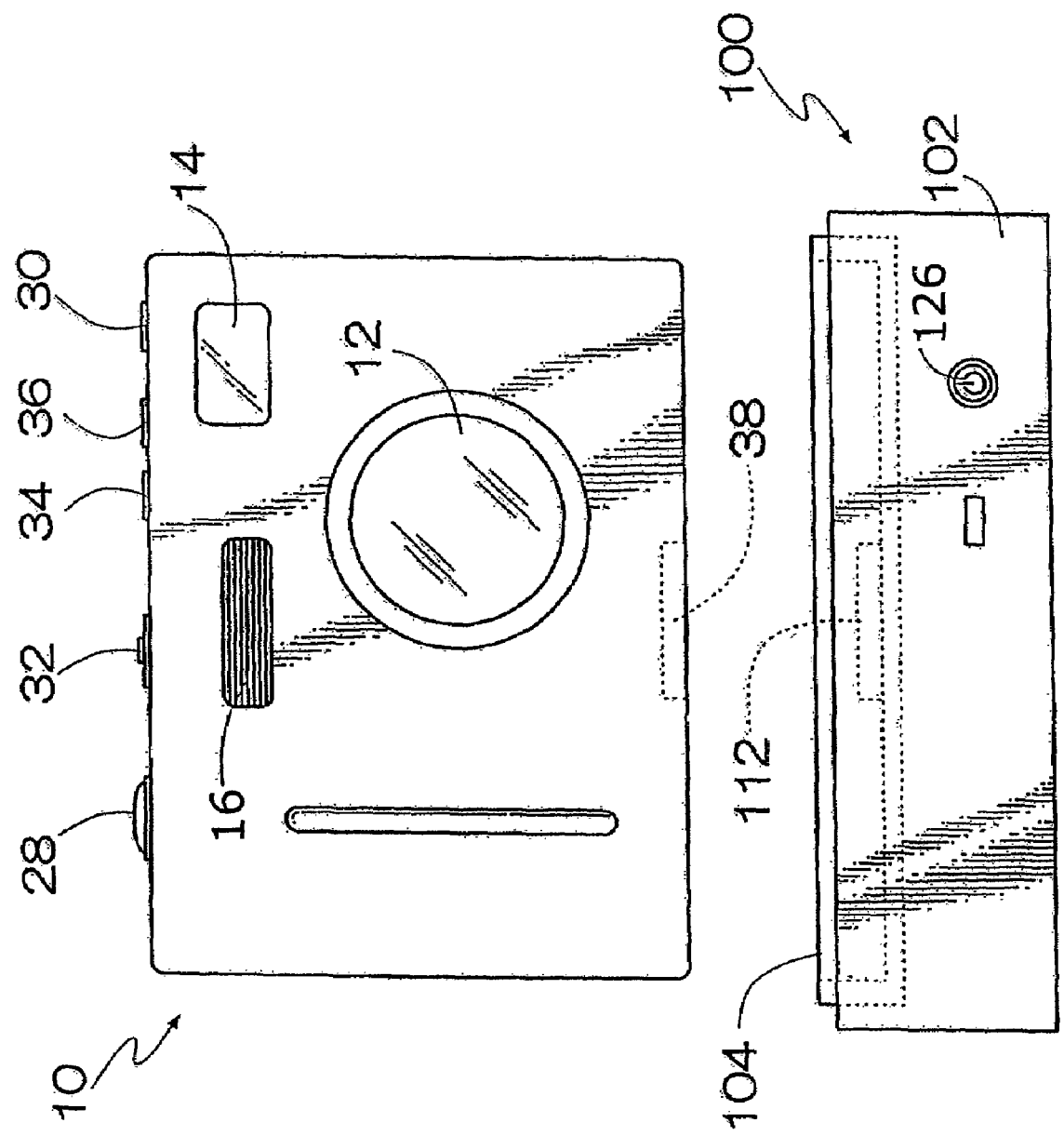
FIG. 2 is a front view of the appearance of the digital camera and the cradle.
Figure 3:
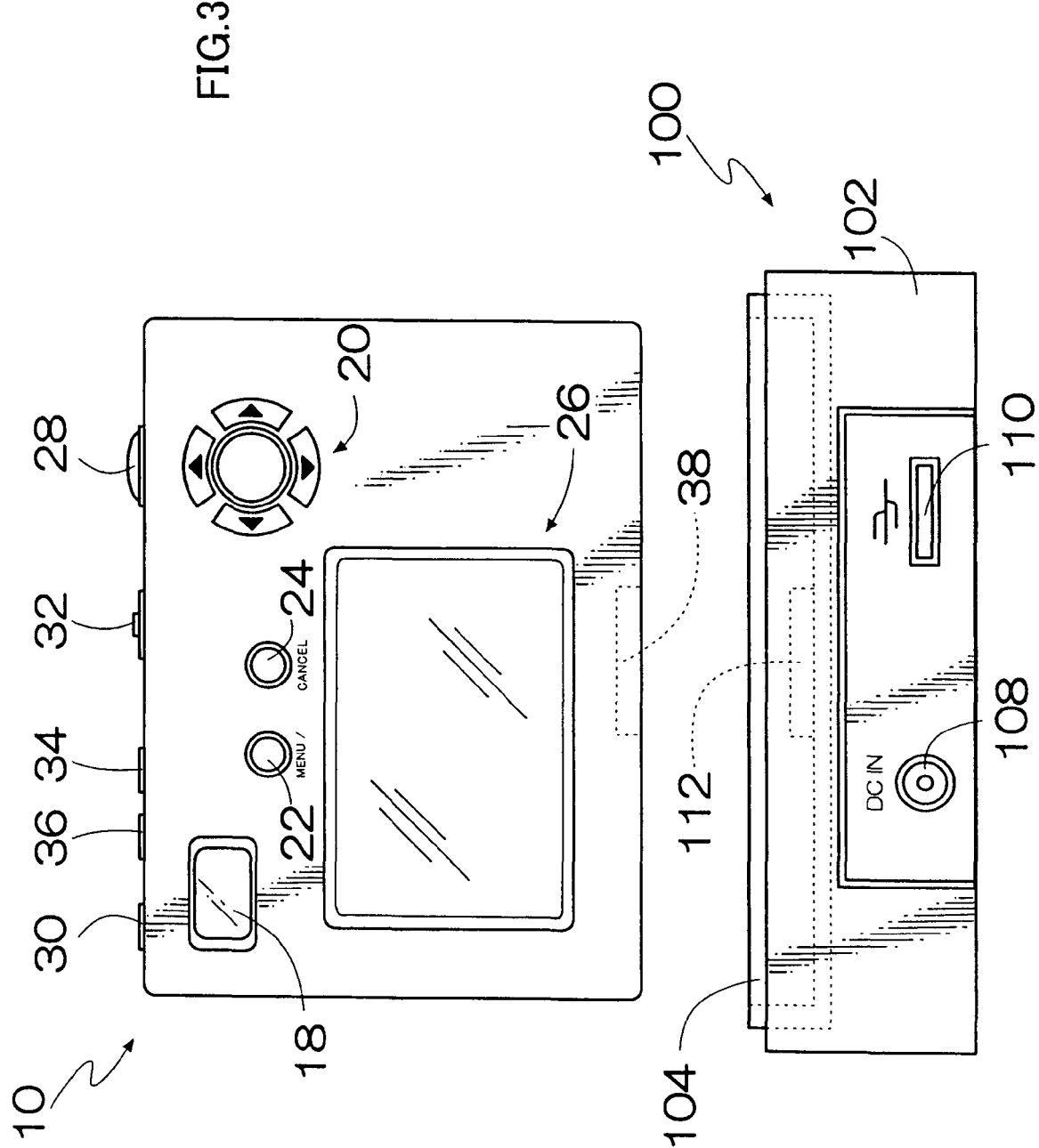
FIG. 3 is a back view of the appearance of the digital camera and the cradle.

FIGS. 2 and 3 are front and back views respectively of the appearance of the digital camera 10 and the cradle 100.

Figure 4:
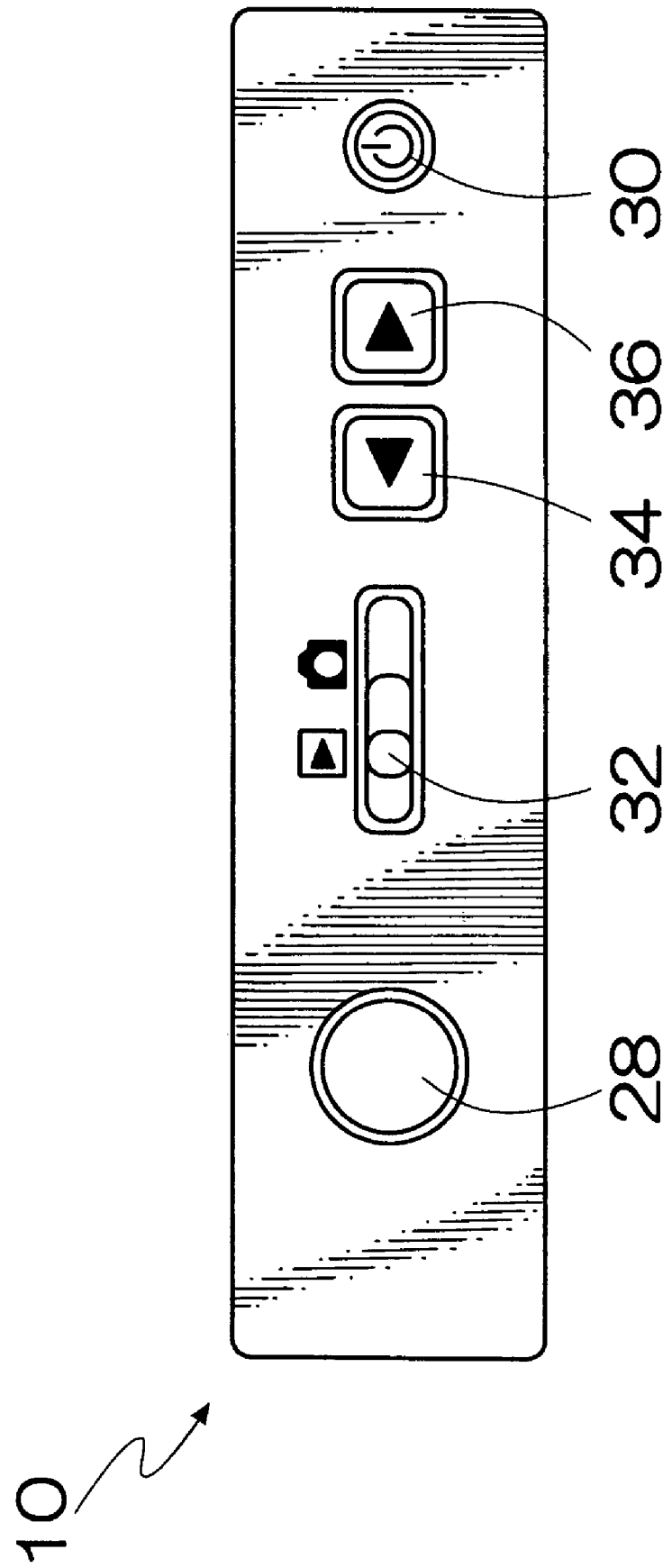
FIG. 4 is a top view of the digital camera.
Figure 5:
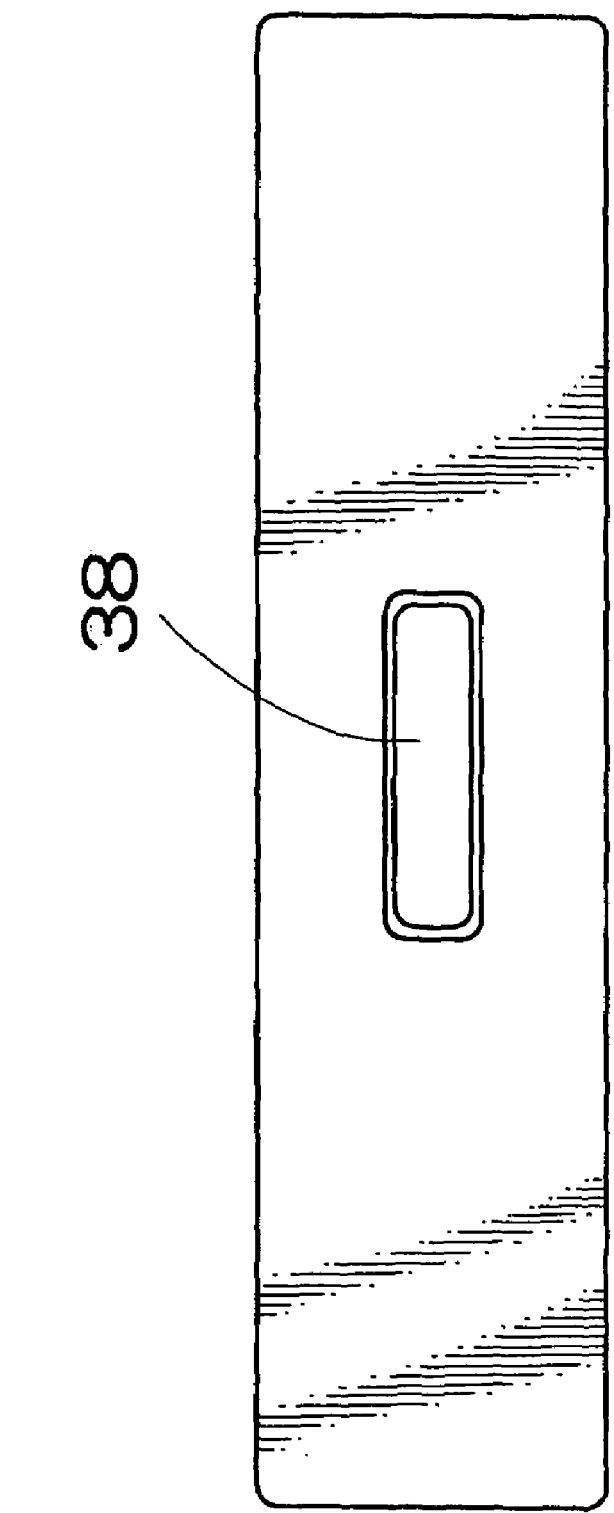
FIG. 5 is a bottom view of the digital camera.

As shown in FIG. 2, there are a taking lens 12, an electric flash light 14, a finder window 16, etc. on the front of the digital camera 10. As shown in FIG. 3, there are a finder 18, a cross button 20, a menu/OK button 22, a cancel button 24, a liquid crystal monitor 26, etc. on the back of the digital camera 10. On the top surface of the digital camera 10, there are a shutter-release button 28, a power button 30, a mode switch 32, a playback button 34, and a reverse button 36 as shown in FIG. 4. As shown in FIG. 5, there is a camera connector 38 at the central position on the bottom surface of the digital camera 10.

The mode switch 32 arranged on the top surface of the digital camera 10 functions as a switch for changing modes in the digital camera 10. The digital camera 10 is set in the shooting mode or a playback mode by sliding the mode switch 32. The playback button 34 and the reverse button 36 arranged on the top surface of the digital camera 10 function as buttons for designating the forward and reverse of a playback image in the playback mode.

On the other hand, the cross button 20 arranged on the back of the digital camera 10 functions as a button for entering the designation in the corresponding four directions, and the cross button 20 is used to select a menu item on the menu screen or various setting items from the corresponding menus. The menu/OK button 22 is used in displaying a menu screen, and determining and executing selected items, etc. The cancel button 24 is used in canceling an item selected on the menu or returning to the operation status before the current status. The liquid crystal monitor 26 is used as a monitor for playing back a shot image and as a display screen of the menu. In the shooting mode, it is used as an electronic view finder for check of the angle of view.

Figure 6:
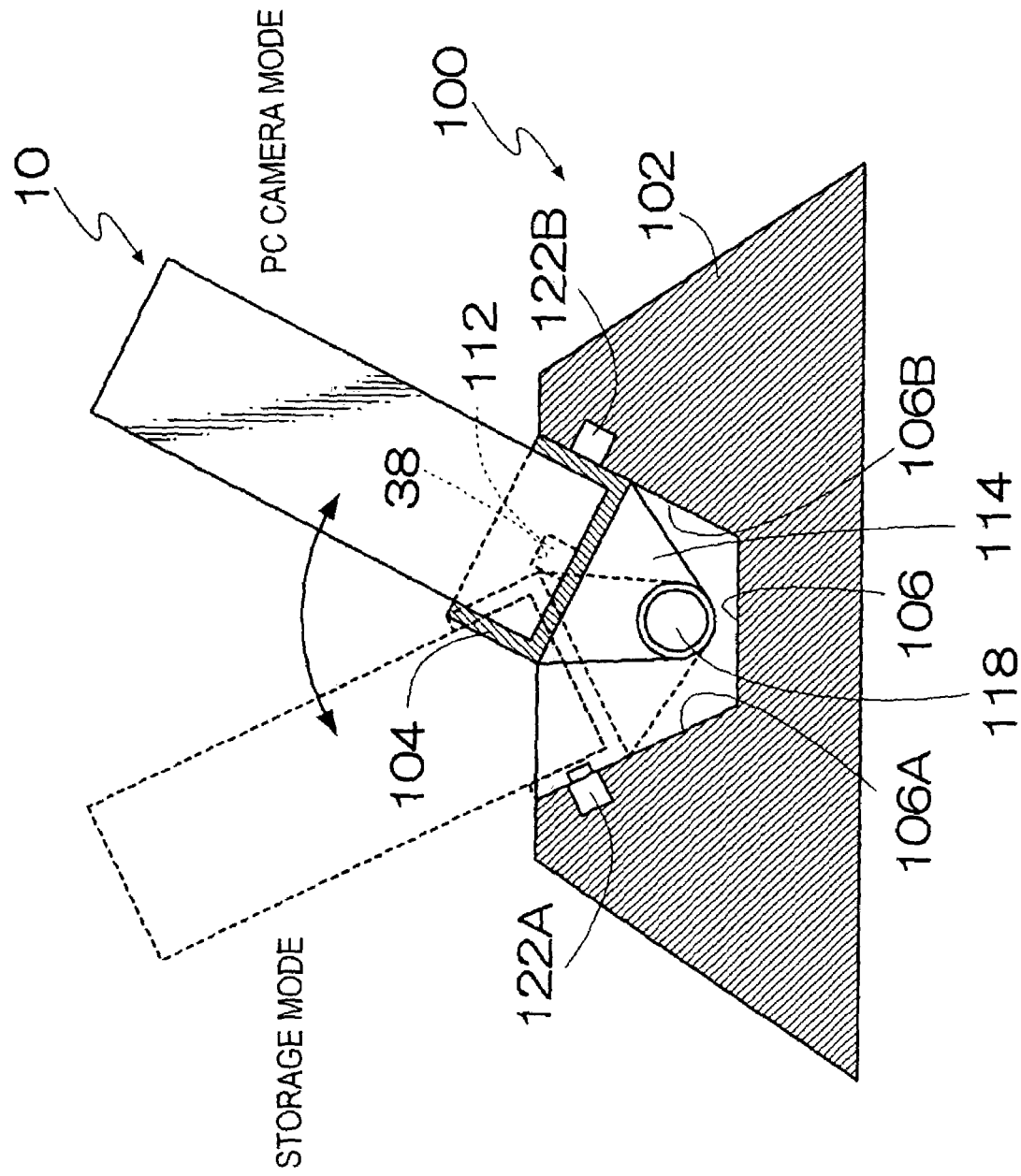
FIG. 6 is a side sectional view of the cradle.

The cradle 100 is configured mainly by a cradle body 102 and a camera mounting unit 104 supported as swayable on the cradle body 102 as shown in FIGS. 2, 3, and 6.

A recess 106 is formed on the top surface of the cradle body 102. In the recess 106, the camera mounting unit 104 through which the digital camera 10 is mounted is accommodated. On the front of the cradle body 102, the power button 126 is arranged as shown in FIG. 2. On the back of the cradle body 102, a DC jack 108 and a USB jack 110 are mounted as shown in FIG. 3.

The camera mounting unit 104 is formed as a square plate so that the bottom of the digital camera 10 can be correctly engaged, and a cradle connector 112 is provided at the center of the bottom of the camera mounting unit 104. When the digital camera 10 is mounted on the camera mounting unit 104, the camera connector 38 arranged on the bottom of the digital camera 10 is connected to the cradle connector 112.

A bearing member 114 is provided below the camera mounting unit 104, and the bearing member 114 is supported by a shaft 118 provided in the recess 106. The camera mounting unit 104 sways on the shaft 118 in the recess 106.

An inner side front 106A and an inner side back 106B of the recess 106 of the cradle body 102 are formed as inclined by predetermined angles, respectively, and the camera mounting unit 104 swayably supported is set in contact with the inner side front 106A or the inner side back 106B. By the camera mounting unit 104 in contact with the inner side front 106A or the inner side back 106B, the digital camera 10 mounted on the camera mounting unit 104 is held as tilted at the predetermined angle relatively to the surface on which the cradle 100 is placed. At this time, the digital camera 10 is held as tilted forward when the camera mounting unit 104 is in contact with the inner side front 106A of the recess 106 as shown with the broken lines in FIG. 6, or is held as tilted backward when the camera mounting unit 104 is in contact with the inner side back 106B as shown with the solid lines in FIG. 6. Thus, the tilt angle is changed.

The inner side front 106A and the inner side back 106B of the recess 106 are respectively provided with a front switch 122A and a back switch 122B. Each switch is turned on by the camera mounting unit 104 when the camera mounting unit 104 touches each inner side, and is turned off when it is off each inner side. That is, the front switch 122A is turned on by being pushed with the front of the camera mounting unit 104 by the camera mounting unit 104 touching the inner side front 106A, while the back switch 122B is turned on by being pushed with the back of the camera mounting unit 104 by the camera mounting unit 104 touching the inner side back 106B. The ON/OFF signal from the front switch 122A and the back switch 122B is outputted to a switch determination circuit 124 (see FIG. 7). The switch determination circuit 124 receives the ON/OFF signal from the front switch 122A and the back switch 122B to determine the current holding status of the digital camera 10.

Figure 7:
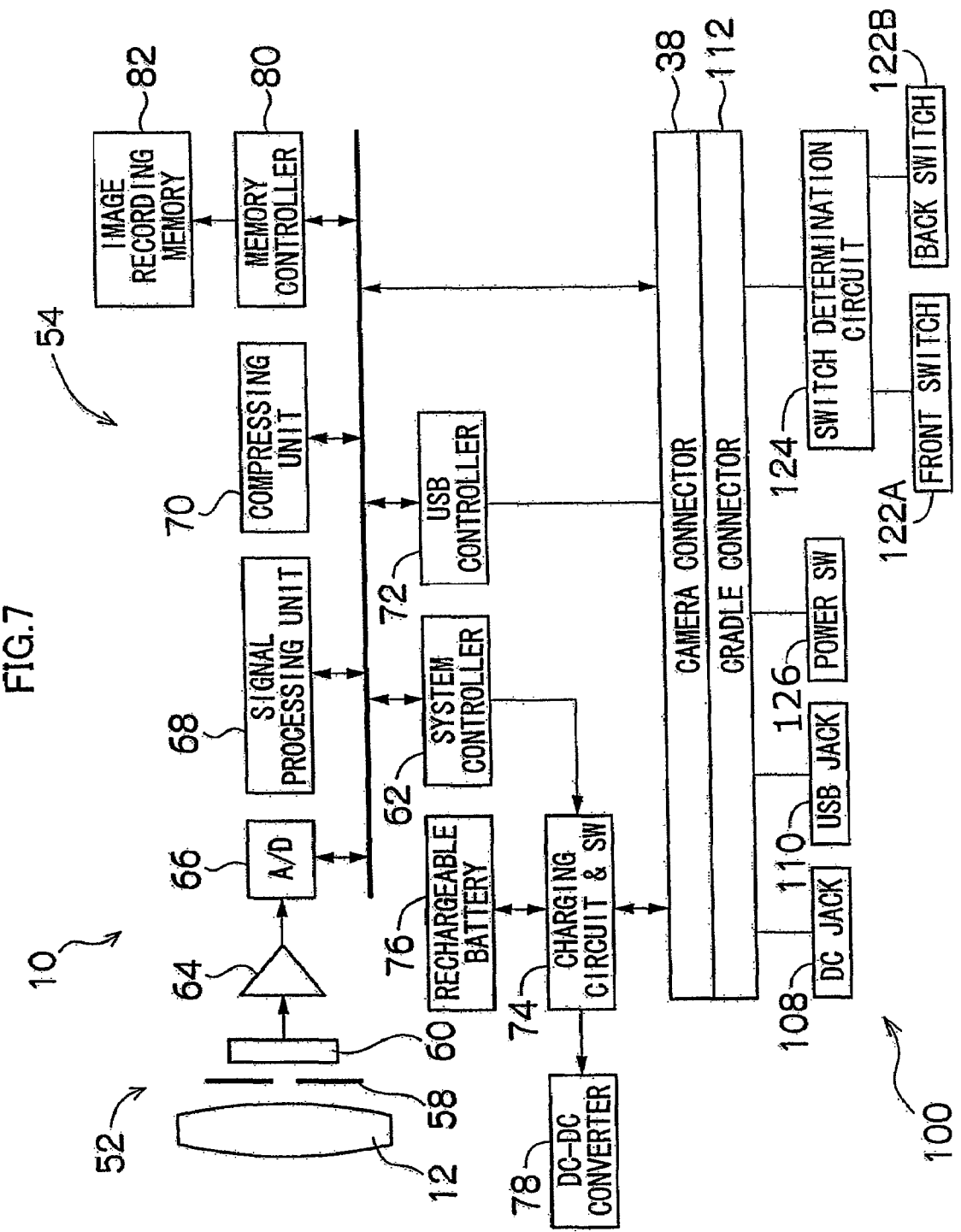
FIG. 7 is a block diagram of the outline of the internal circuits of the digital camera and the cradle.

FIG. 7 is a block diagram showing the outline of the inner circuit of the digital camera 10 and the cradle 100.

As shown in FIG. 7, the digital camera 10 is configured by an image-capturing unit 52 and a signal processing unit 54. The image-capturing unit 52 comprises the taking lens 12, an iris 58, and a solid-state image pickup device 60, and captures a subject image according to an instruction from the signal processing unit 54. The solid-state image pickup device 60 is configures by, for example, a CCD. The CCD captures an image by a series of operations of accumulating, transferring, and discharging the electric charge on the photoreceiving surface thereof.

The signal processing unit 54 fetches an image signal from the image-capturing unit 52 through an amplifier 64 under the control of a system controller 62, and an A/D converter 66 converts the signal into a digital signal. A digital signal processing unit 68 performs predetermined signal processing (white-balance adjustment, gamma correction, chrominance difference signal processing, etc.), and then a compressing unit 70 performs a data compressing process. The compressed digital image data is recorded through a memory controller 80 on a memory card 82 inserted in a card slot.

The power button 126, the DC jack 108, the USB jack 110, and the switch determination circuit 124 of the cradle 100 are directly connected to corresponding terminals in the cradle connector 112 through wiring.

When the digital camera 10 is mounted on the cradle 100, the USB jack 110 of the cradle 100 is connected to a USB controller 72 of the digital camera 10 through the cradle connector 112 and the camera connector 38. When the system controller 62 detects the USB connection while the digital camera 10 is powered up, the system controller 62 automatically sets the operation mode of the digital camera 10 in the USB mode, and starts the USB communications with the personal computer 200 through the USB controller 72.

The DC jack 108 is connected to a charging circuit and a switch circuit 74 in the digital camera 10 through the cradle connector 112 and the camera connector 38. When power of a direct current is applied from an AC adapter (not shown) to the DC jack 108, the direct current power is provided for the charging circuit and the switch circuit 74. The charging circuit and the switch circuit 74 starts a charging operation on a rechargeable battery 76 when the direct current power is applied while the digital camera 10 is powered down, and stops the charging operation when the rechargeable battery 76 is fully charged. On the other hand, the charging circuit and the switch circuit 74 performs the switching process at a command from the system controller 62 such that the above-mentioned charging operation is not be performed while the digital camera 10 is powered up, and that the direct current power inputted through the DC jack 108 is supplied to a DC-DC converter 78. The DC-DC converter 78 generates various types of voltage power source requested by each circuit in the digital camera 10 from the inputted direct current power, and provides the power for each circuit in the digital camera 10.

The switch determination circuit 124 outputs a determination signal indicating the holding status of the digital camera 10 mounted on the cradle 100 to the system controller 62 through the cradle connector 112 and the camera connector 38.

As described above, when the system controller 62 of the digital camera 10 detects the USB connection while the digital camera 10 is powered up, the system controller 62 automatically sets the operation mode of the digital camera 10 in the USB mode. If the USB mode is set, the digital camera 10 functions as appliances of two different device classes on the connected personal computer 200.

That is, the digital camera 10 has the storage mode in which it functions as a card reader for reading and writing data on the memory card 82 and the PC camera mode in which it functions as a PC camera for transmitting a signal of a picture being shot for use in a video conference, etc. in real time.

Then, the digital camera 10 selects the storage mode or the PC camera mode in the USB mode according to the tilt angle of the digital camera 10 mounted on the cradle 100. That is, when the system controller 62 of the digital camera 10 detects forward tilt by the inputted signal from the switch determination circuit 124, the system controller 62 switches the mode into the storage mode. When the system controller 62 detects backward tilt, the system controller 62 switches the mode into the PC camera mode.

Thus, in the digital camera system according to the present embodiment, the storage mode and the PC camera mode can be automatically switched by changing the tilt angle of the digital camera 10 mounted on the cradle 100, thereby eliminating the laborious settings on the camera side, and improving the operability.

Additionally, the user can check the current setting mode only by checking the posture of the digital camera 10 mounted on the cradle 100.

The method of detecting the switch of tilt angles of the digital camera 10 is not limited to the method according to the above-mentioned embodiment, but can be a detecting method in another system.

Figure 8:
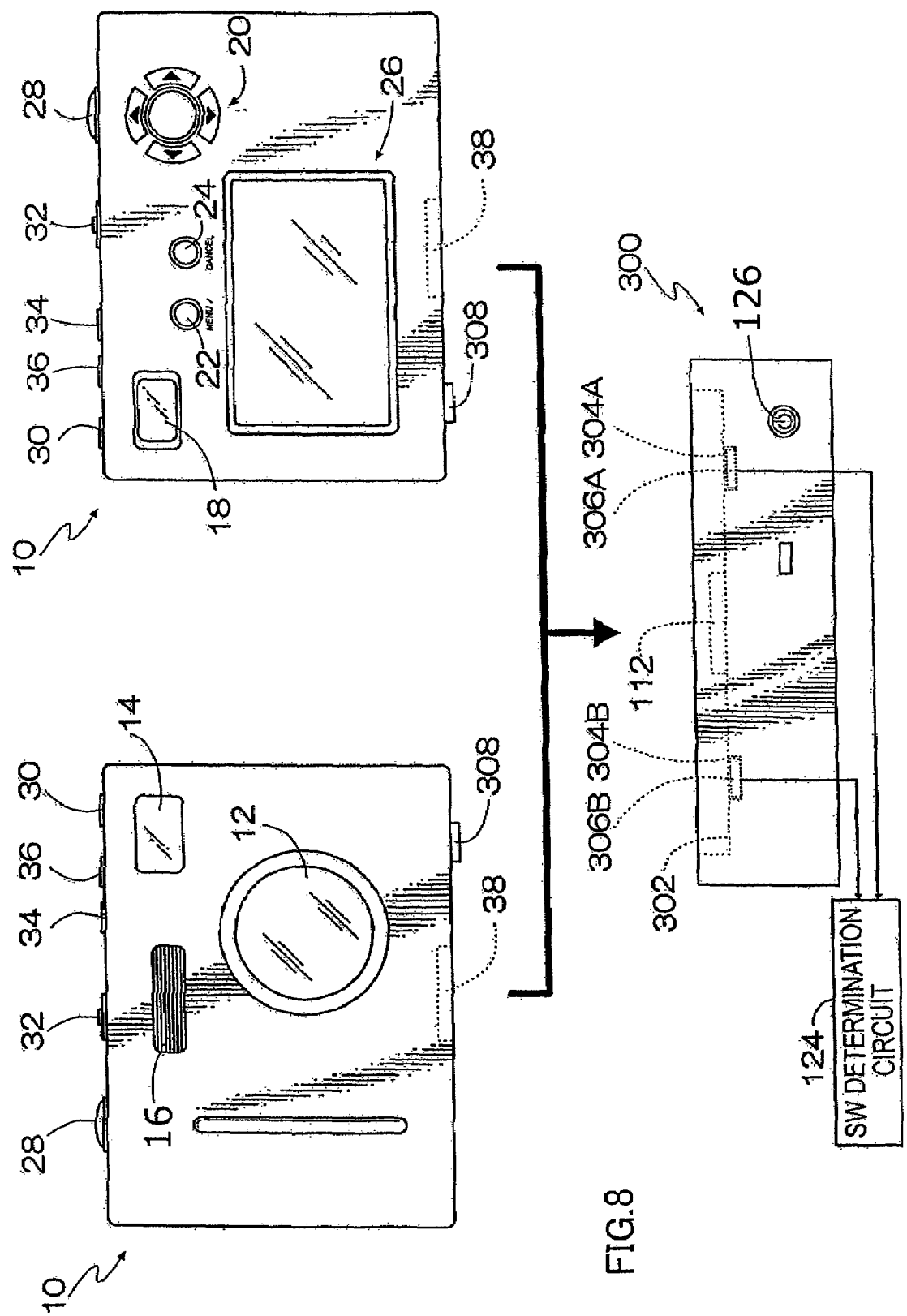
FIG. 8 is a front view of the appearance of the digital camera and the cradle according to the second embodiment of the present invention.

FIG. 8 is a front view of the appearance of the digital camera 10 and a cradle 300 according to the second embodiment of the digital camera system of the present invention.

As shown in FIG. 8, in the digital camera system according to the second embodiment, the digital camera 10 can be mounted on the cradle 300 with facing either forward and backward with respect to the cradle 300. Then, according to the direction of the digital camera 10 mounted on the cradle 300, the storage mode and the PC camera mode of the USB-connected digital camera 10 can be switched.

On the top surface of the cradle 300, a mounting unit 302 on which the digital camera 10 is mounted is formed, and the cradle connector 112 is provided at the center of the bottom surface of the mounting unit 302.

On the bottom surface of the mounting unit 302, a pair of holes 304A and 304B are formed symmetrically about the cradle connector 112 as shown in FIGS. 8 and 9. The holes 304A and 304B are provided with switches 306A and 306B, respectively.

On the other hand, on the bottom surface of the digital camera 10, a projection 308 is formed on the right-hand side as viewed from the front as shown in FIGS. 8 and 9. When the digital camera 10 is mounted on the cradle 300 with the front face directed forward, the projection 308 is engaged in the right hole 304A of the cradle 300 and presses the right switch 306A. When the digital camera 10 is mounted on the cradle 300 with the back face directed forward, the projection 308 is engaged in the left hole 304B of the cradle 300 and presses the left switch 306B.

Each of the switches 306A and 306B is turned on by a press by the projection 308, and is turned off by a release from the projection 308. An ON/OFF signal is outputted from each of the switches 306A and 306B to the switch determination circuit 124. The switch determination circuit 124 determines the current holding status (front or back) of the digital camera 10 by receiving the ON/OFF signal from the switch 306A or 306B. Then, a determination signal indicating the holding status of the digital camera 10 mounted on the cradle 300 is outputted to the system controller 62 of the digital camera 10 through the cradle connector 112 and the camera connector 38.

Like the cradle 100 according to the above-mentioned first embodiment, the cradle 300 is provided with the power switch, the DC jack, the USB jack, etc. If the digital camera 10 is mounted on the cradle 300, the USB jack of the cradle 300 is connected to the USB controller 72 of the digital camera 10 through the cradle connector 112 and the camera connector 38, and the DC jack is connected to the charging circuit and the switch circuit 74 through the cradle connector 112 and the camera connector 38 as the cradle 100 according to the first embodiment.

With the digital camera system according to the second embodiment with the above-mentioned configuration, when the digital camera 10 is mounted on the cradle 300 with the front facing forward, the projection 308 on the bottom of the digital camera 10 is engaged in the right hole 304A of the cradle 300 and the right switch 306A is turned on.

By receiving the ON signal from the right switch 306A, the switch determination circuit 124 determines that the digital camera 10 is mounted with the front facing forward, and outputs to the system controller 62 of the digital camera 10 a signal for setting the mode of the digital camera 10 in the PC camera mode. Upon receipt of the inputted signal from the switch determination circuit 124, the system controller 62 of the digital camera 10 sets the mode of the digital camera 10 in the PC camera mode.

On the other hand, if the digital camera 10 is mounted on the cradle 300 with the back facing forward, then the projection 308 on the bottom of the digital camera 10 is engaged in the left hole 304B of the cradle 300, and the left switch 306B is turned on.

By receiving the ON signal from the left switch 306B, the switch determination circuit 124 determines that the digital camera 10 is mounted with the back facing forward, and outputs to the system controller 62 of the digital camera 10 a signal for setting the mode of the digital camera 10 in the storage mode. Upon receipt of the inputted signal from the switch determination circuit 124, the system controller 62 of the digital camera 10 sets the mode of the digital camera 10 in the storage mode.

Thus, in the digital camera system according to the present embodiment, the storage mode and the PC camera mode can be automatically switched according to the direction of the digital camera 10 mounted on the cradle 300, thereby eliminating the laborious operations on the camera side, and improving the operability.

Furthermore, the user can check the currently set mode of the digital camera 10 only by checking the direction of the digital camera 10 mounted on the cradle 300.

The system of determining the direction of the mounted digital camera 10 is not limited to the system according to the above-mentioned embodiment, but can be any other appropriate systems.

According to the present embodiment, the direction of the mounted digital camera 10 is determined using the switches 306A and 306B provided on the cradle 300. However, it can be determined by the digital camera 10. For example, the camera connector can be provided with the function of determining the direction of the mounted digital camera 10 so that the storage mode and the PC camera mode can be switched according to the determination result.

Figure 10A:
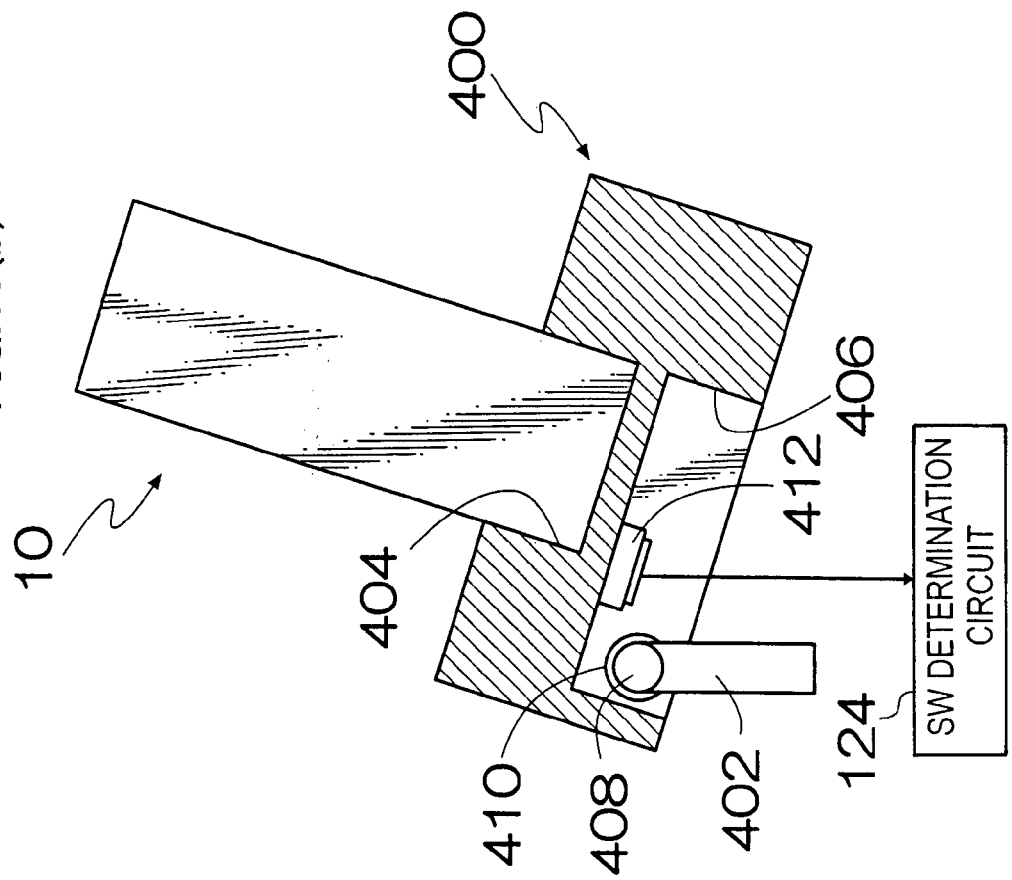
FIGS. 10(a) and 10(b) are sectional views of the side showing the configuration of the digital camera and the cradle according to the third embodiment of the present invention.
Figure 10B:
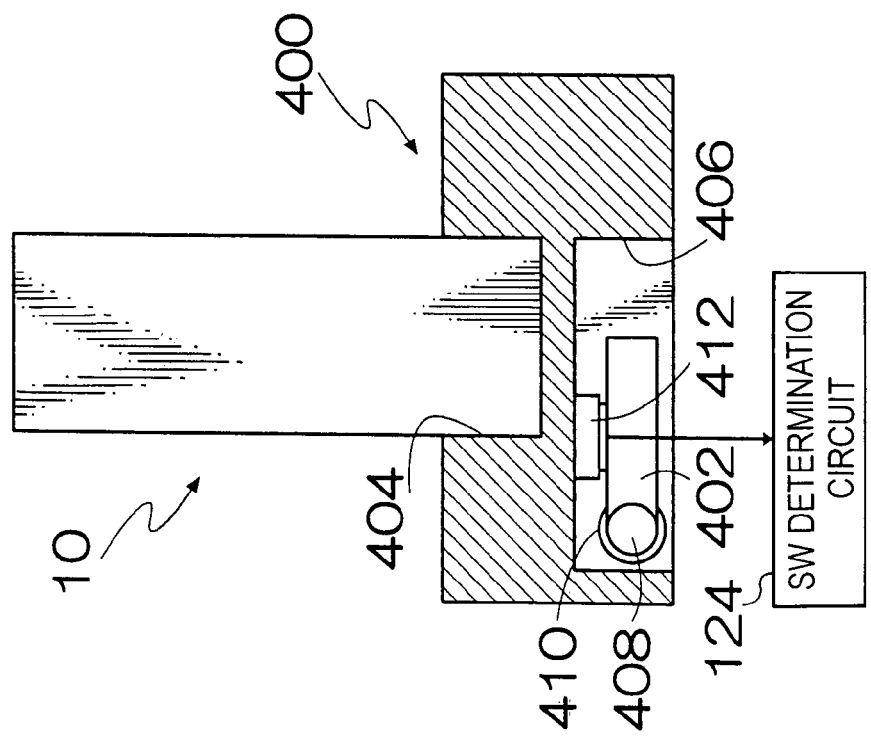

FIGS. 10(*a*) and 10(*b*) are sectional views of the side showing the configuration of the digital camera 10 and a cradle 400 according to the third embodiment of the digital camera system of the present invention.

As shown in FIGS. 10(*a*) and 10(*b*), in the digital camera system according to the third embodiment, a foldable leg 402 is provided on the bottom of the cradle 400 so that the tilt angle of the digital camera 10 mounted on the cradle 400 can be varied. By folding and extending the foldable leg 402, the storage mode and the PC camera mode of the USB-connected digital camera 10 can be switched.

A mounting unit 404 on which the digital camera 10 is mounted is provided on the top surface of the cradle 400, and a cradle connector (not shown) is provided at the center of the bottom of the mounting unit 404.

On the other hand, a recess 406 is formed on the bottom of the cradle 400, and the foldable leg 402 can be stored in the recess 406. The base portion of the foldable leg 402 is provided with a rotation axis 408 supported by a bearing 410 provided in the recess 406, through which the foldable leg 402 is supported as swayable.

A switch 412 is provided in the recess 406. The switch 412 is turned off by a press by the foldable leg 402 when the foldable leg 402 is folded, and is turned on by a release from the press when the foldable leg 402 is extended. The ON/OFF signal of the switch 412 is outputted to the switch determination circuit 124.

The switch determination circuit 124 determines the holding status of the digital camera 10 mounted on the cradle 400 by receiving the ON/OFF signal from the switch 412.

That is, as shown in FIG. 10(*b*), the switch determination circuit 124 detects that the foldable leg 402 is extended by receiving the ON signal from the switch 412, and determines that the digital camera 10 is held as tilted. By receiving the ON signal from the switch 412, the switch determination circuit 124 outputs to the system controller 62 of the digital camera 10 through the cradle connector and the camera connector a signal for setting the mode of the camera in the PC camera mode. Upon receipt of the inputted signal from the switch determination circuit 124, the system controller 62 of the digital camera 10 sets the mode of the digital camera 10 in the PC camera mode.

On the other hand, as shown in FIG. 10(*a*), the switch determination circuit 124 detects that the foldable leg 402 is folded by receiving the OFF signal from the switch 412, and determines that the digital camera 10 is held vertically. By receiving the OFF signal from the switch 412, the switch determination circuit 124 outputs to the system controller 62 of the digital camera 10 through the cradle connector and the camera connector a signal for setting the mode of the camera in the storage mode. Upon receipt of the inputted signal from the switch determination circuit 124, the system controller 62 of the digital camera 10 sets the mode of the digital camera 10 in the storage mode.

Like the cradle 100 according to the first embodiment, the cradle 400 is provided with the power switch, the DC jack, the USB jack, etc. If the digital camera 10 is mounted on the cradle 400, the USB jack of the cradle 400 is connected to the USB controller 72 of the digital camera 10 through the cradle connector and the camera connector, and the DC jack is connected to the charging circuit and the switch circuit 74 through the cradle connector and the camera connector as the cradle 100 according to the first embodiment.

Thus, in the digital camera system according to the present embodiment, the storage mode and the PC camera mode can be automatically switched according to the holding status of the digital camera 10 mounted on the cradle 400, thereby eliminating the laborious operations on the camera side, and improving the operability.

Furthermore, the user can check the currently set mode of the digital camera 10 only by checking the posture of the digital camera 10 mounted on the cradle 400.

In the above-mentioned embodiments, an example of the digital camera 10 connecting to a personal computer through a cradle is described, but a connection to a television set, etc. by providing an A/V jack for the cradle can be acceptable. In this case, for example, the digital camera 10 is configured such that the shooting mode and the playback mode can be switched according to the tilt angle or the mounting direction, and that the playback button 34 and the reverse button 36 provided on the top surface can function only in the playback mode.

In the above-mentioned embodiments, only two modes, that is, the PC camera mode and the storage mode, can be selected as the mode of the camera, but any other appropriate modes can be selected. In this case, for example, if three modes can be selected, the digital camera mounted on the cradle is configured such that the tilt angle can be varied at three levels.

Furthermore, a plurality of modes can be selected by a combination of the tilt angle and the mounting direction of the digital camera mounted on the cradle.

Described below is the fourth embodiment of the present invention.

Figure 11:
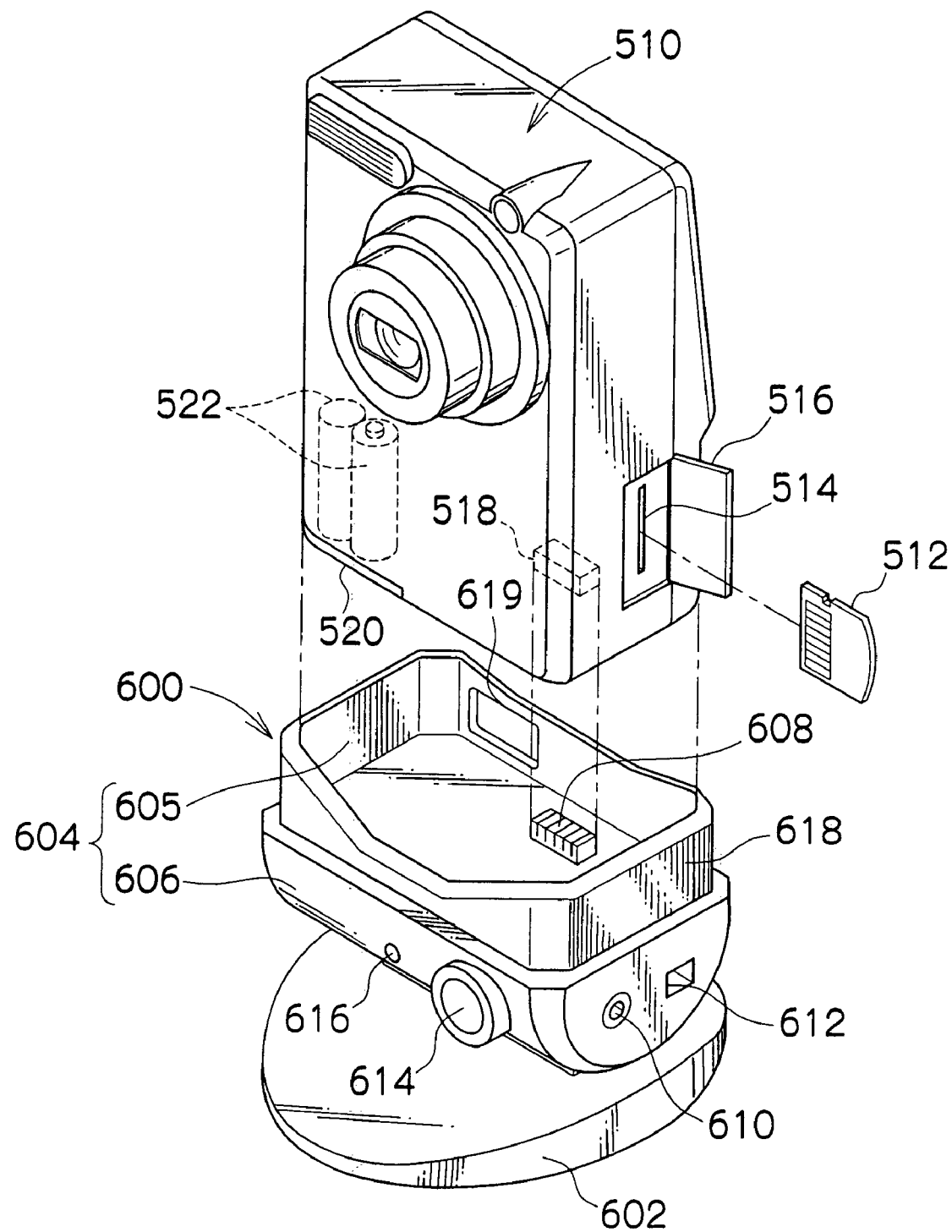
FIG. 11 is a perspective view of the digital camera system according to the fourth embodiment of the present invention.

FIG. 11 is a perspective view of the digital camera system according to the fourth embodiment of the present invention. The internal configuration of the system shown in FIG. 11 is the same as that shown by the block diagram in FIG. 7.

As shown in FIG. 11, a card slot 514 is provided in one side portion of a digital camera 510 so that a memory card 512 can be inserted and removed. The card slot 514 is protected by a flap-type protective cover 516 for keeping dust out.

A cradle connection terminal 518 and a battery cover 520 are provided on the bottom portion of the digital camera 510. The cradle connection terminal 518 corresponds to the camera connector 38 described by referring to FIG. 7. The cradle connection terminal 518 shown in FIG. 11 is formed as a recess not to project out of the contour (plane portion of the bottom) of the camera body. Additionally, to keep dust out, etc. onto the terminal surface, a flap-type terminal cover (not shown) is provided.

The battery cover 520 is mounted as openable and closable on the bottom portion of the camera body. The internal battery box (not shown) can be accessed by opening the battery cover 520. A battery 522 is set in the battery box to apply power. The battery 522 can be a rechargeable secondary battery.

A cradle 600 comprises a leg portion 602 functioning as a base (foundation) unit and a camera mounting unit 604 supported by the leg portion 602. The camera mounting unit 604 comprises a setup portion 605 formed as a hollow box to match the shape of the bottom portion of the digital camera 510, and a lower portion 606 formed as a semicylindrical unit having an arc portion downwards with the portions 605 and 606 being united into one body.

A connection terminal 608 is provided on the inner bottom (recess) portion of the setup portion 605. The connection terminal 608 corresponds to the cradle connector 112 described above by referring to FIG. 7. The connection terminal 608 shown in FIG. 11 is engaged in the cradle connection terminal 518 on the camera side when the digital camera 510 is provided on the setup portion 605 so that the digital camera 510 can be electrically connected to the cradle 600. The cradle 600 functions as a stand for stably holding the digital camera 510, and also functions as a terminal for relaying the charging and the connection to external equipment by electrically connecting to the digital camera 510.

A power input terminal 610 and a digital communications terminal (for example, a USB terminal) 612 are provided on one side of the lower portion 606 of the camera mounting unit 604. A plug of the AC power adapter (not shown) is connected to the power input terminal 610 for applying power. External equipment such as a personal computer, etc. is connected to the digital communications terminal 612 through a communications cable (not shown). These terminals 610 and 612 are connected to the connection terminal 608 in the cradle 600. It is also possible to provide the power input terminal 610 and 612 on the leg portion 602.

On the front surface of the lower portion 606, a power button 614 and a light emitting portion 616 for indicating the status are provided. The power button 614 is used in turning on and off the power for the digital camera 510 connected to the cradle 600. The light emitting portion 616 indicating the status changes in luminous status (turned on, turned off, blinking, luminous color, etc.) according to the operation status of the digital camera 510.

In a support 618 in the setup portion 605 for holding the lower portion of the digital camera 510, an opening portion 619 is formed in a part facing the back of the camera so that the speaker (not shown) of the digital camera 510 can be exposed through the opening portion 619.

Figure 12A:
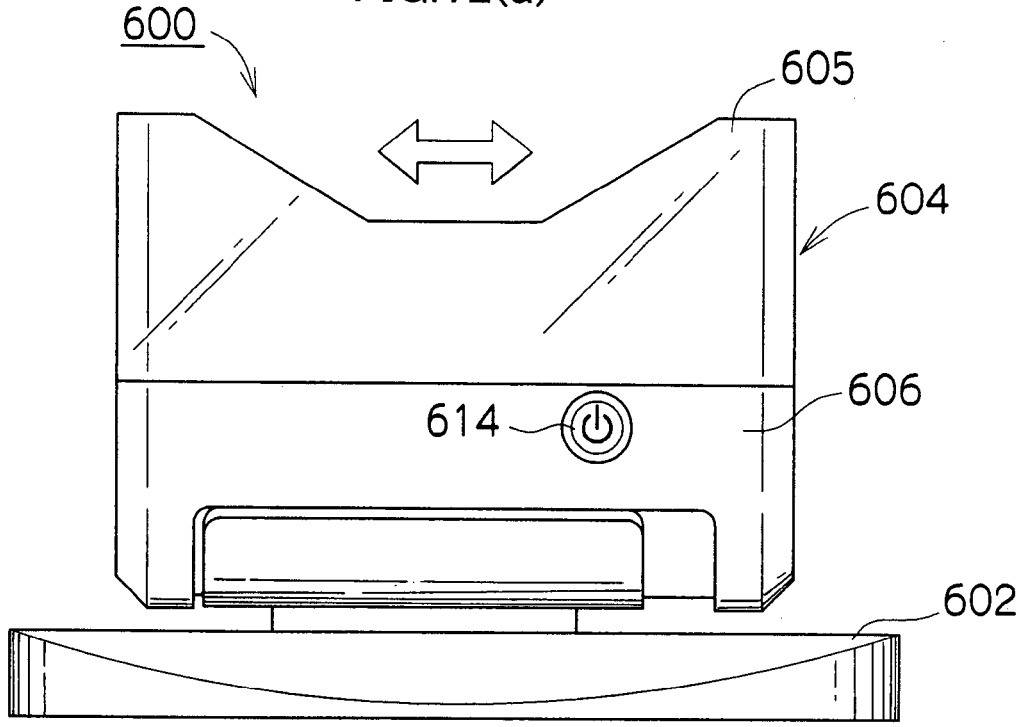
FIGS. 12(a) and 12(b) are front views of the cradle shown in FIG. 11.
Figure 12B:
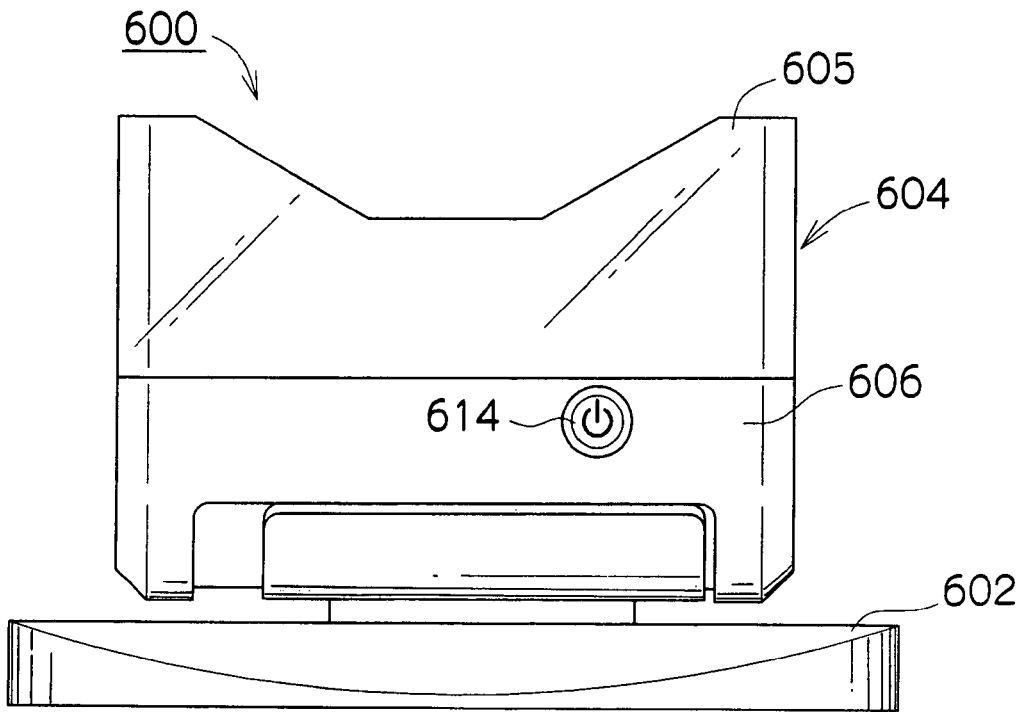

FIGS. 12(a) and 12(b) are front views of the cradle 600. The camera mounting unit 604 of the cradle 600 is mounted movably from side to side on the leg portion 602 as shown in FIGS. 12(a) and 12(b). The user can easily move the camera mounting unit 604 by hand. When the camera mounting unit 604 is slid right and stopped in the rightmost position (rightmost end position) as shown in FIG. 12(a), a sensor switch (not shown) works, and a signal indicating the stop position is outputted. The signal is transmitted to the digital camera 510 by way of the connection terminal 608.

If the camera mounting unit 604 is slid left and stopped in the leftmost position (leftmost end position) as shown in FIG. 12(b), a sensor switch (not shown) works, and a signal indicating the stop position is outputted, and is transmitted to the digital camera 510.

The digital camera 510 performs control of switching the operation mode according to the signals indicating the position of the camera mounting unit 604 received from the cradle 600. For example, switching the storage mode and the PC camera mode of the USB mode according to the slide stop positions of the camera mounting unit 604, switching the playback mode and the USB mode, switching the playback mode and the shooting mode, etc. can be performed.

When the USB mode is changed, the digital camera 510 resets the bus to reconfigure the communications mode, and switches from the storage mode to the PC camera mode (or inversely).

The type of the USB mode is not limited to the above-mentioned storage mode and the PC camera mode. For example, in a PTP (picture transfer protocol) mode, an image to be transmitted is selected on the camera side using the operation system of the digital camera 510, and a transferring operation is performed in a predetermined procedure (for example, pressing a transfer button on the camera side), thereby transmitting the selected image to the external equipment.

The examples of stopping the camera mounting unit 604 at two points, that is, the left and right end points, are described above by referring to FIGS. 12(a) and 12(b). However, three or more stopping positions (multipoint positions) can be set in a moving range. It is preferable to provide an engaging system having appropriate force (click system, etc.) such that the camera mounting unit 604 can be stopped correctly at each stopping point associated with mode switching.

According to the present embodiment, when the digital camera 510 is mounted on the cradle 600, the digital camera 510 is connected to external equipment such as a personal computer, etc. through the cradle 600 and the power source of the digital camera 510 is turned on, the operation mode of the digital camera 510 can be switched only by sliding the camera mounting unit 604 of the cradle 600 together with the digital camera 510 from side to side as shown in FIGS. 12(a) and 12(b).

On the other hand, if the power of the digital camera 510 is turned off with the digital camera 510 mounted on the cradle 600, then the charging mode is automatically entered, and the battery 522 in the camera can be charged by the power applied from the cradle 600.

Figure 13:
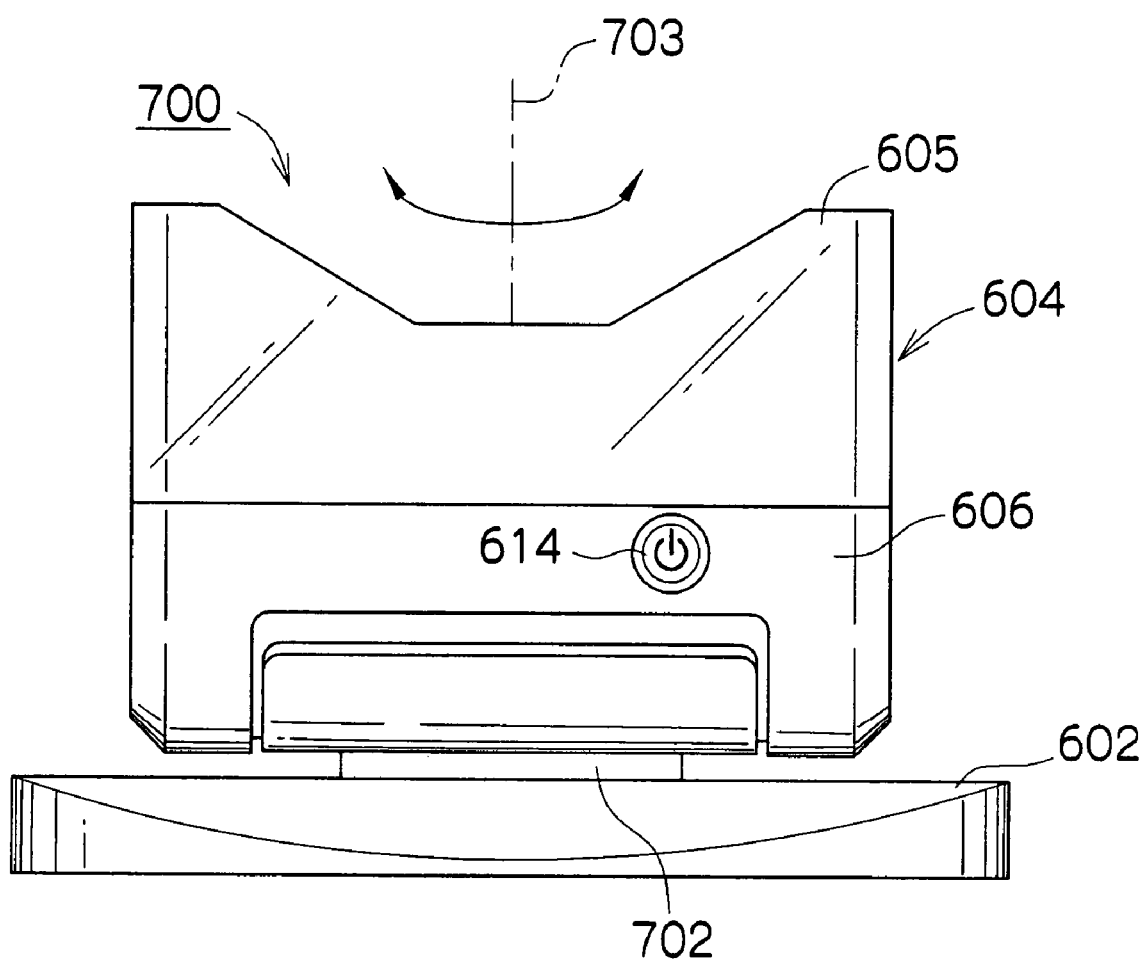
FIG. 13 is a front view of the cradle according to the fifth embodiment of the present invention.
Figure 14:
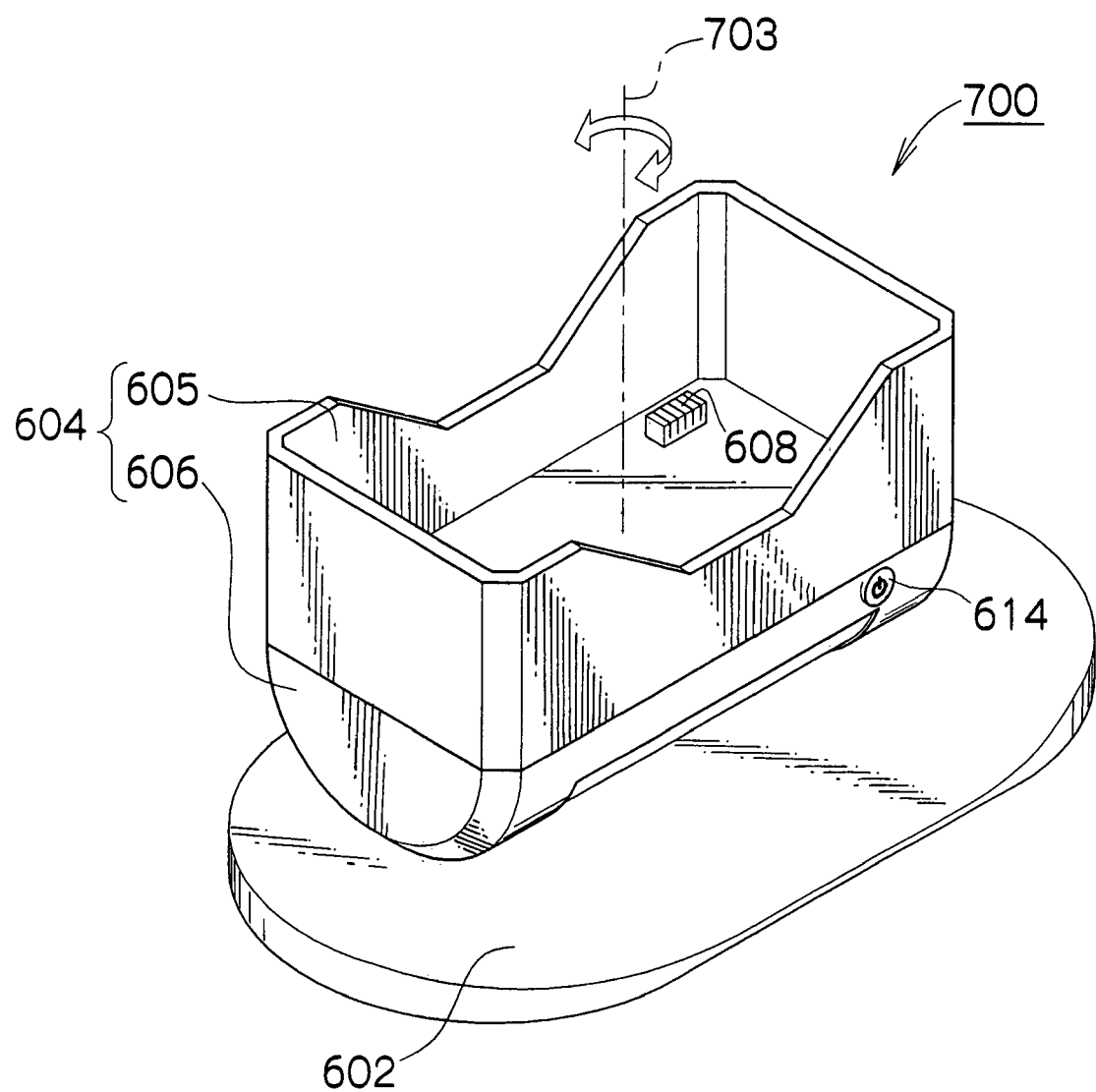
FIG. 14 is a perspective view of the cradle shown in FIG. 13.

FIG. 13 is a front view of a cradle 700 according to the fifth embodiment of the present invention. FIG. 14 is a perspective view of the cradle 700 shown in FIG. 13. The units commonly appearing in FIGS. 11, 12(a) and 12(b) are assigned the same reference numerals, and the detailed explanation is omitted here.

The cradle 700 shown in FIG. 13 has a rotation system in a coupling portion 702 between the camera mounting unit 604 and the leg portion 602. As shown in FIG. 13, the camera mounting unit 604 is mounted rotatably on the leg portion 602 with a rotation axis 703 placed in the center parallel to the vertical direction of the cradle 700. The user can easily rotate the camera mounting unit 604 by hand. In the case of the cradle 700 having the above-mentioned rotation system, it is preferable that the power input terminal 610 and the digital communications terminal 612 are mounted on the leg portion 602.

According to the present embodiment, the movable range of the rotation system is not specifically limited, but it is preferable that the digital camera 510 can be 180° rotated without changing the position of the leg portion 602. By using the rotation system with the maximum rotational range of 180°, the digital camera 510 can be turned from the position where the liquid crystal monitor on the back of the digital camera 510 faces forward to the position where the taking lens of the digital camera 510 facing forward (or inversely) by 180° rotating only the camera mounting unit 604 on the rotation axis 703 with the leg portion 602 keeping stationary.

For example, the system is configured so that the camera mounting unit 604 can be rotatable between the position shown in FIG. 13 where the digital camera 510 faces forward (hereinafter referred to as a reference position) to the position where the camera mounting unit 604 is 180° rotated (the digital camera 510 is held as facing backward), and that a signal indicating the stop position is outputted when the camera mounting unit 604 is stopped in either end position of the movable limit of the movable range (that is, the reference position or the 180° position from the reference position).

The signal corresponding to the stop position of the camera mounting unit 604 is transmitted to the digital camera 510 by way of the connection terminal 608, and the mode of the digital camera 510 is automatically switched.

Obviously, the configuration in which the rotation can be performed in the range of 180° clockwise or counterclockwise from the reference position shown in FIG. 13, or the configuration in which the rotation can be performed by 360° about the rotation axis 703 can be realized. Furthermore, the configuration in which there is not limit to the rotation range (endless structure without a stopper which limits the rotation range) can be realized.

The number of stop positions of the camera mounting unit 604 associated with the mode switching of the digital camera 510 is not limited to two (2), but a larger number of stop positions can be set to generate a signal indicating each position, thereby performing various mode change control.

In addition to the above-mentioned rotation system in the example shown in FIG. 13, the camera mounting unit 604 is mounted as tiltable relatively to the leg portion 602 such that the tilt angle of the digital camera 510 can be changed. The tilt angle and the rotation position of the digital camera 510 are individually determined, and can be combined to switch the mode of the digital camera 510.

Figure 15A:
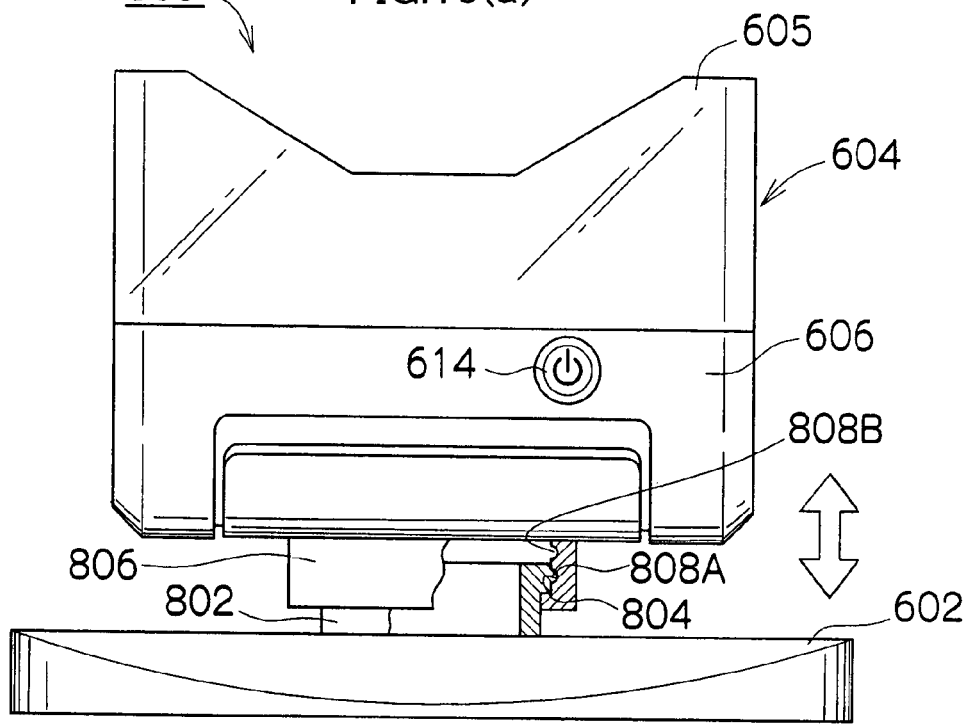
FIGS. 15(a) and 15(b) are front views of the cradle according to the sixth embodiment of the present invention.
Figure 15B:
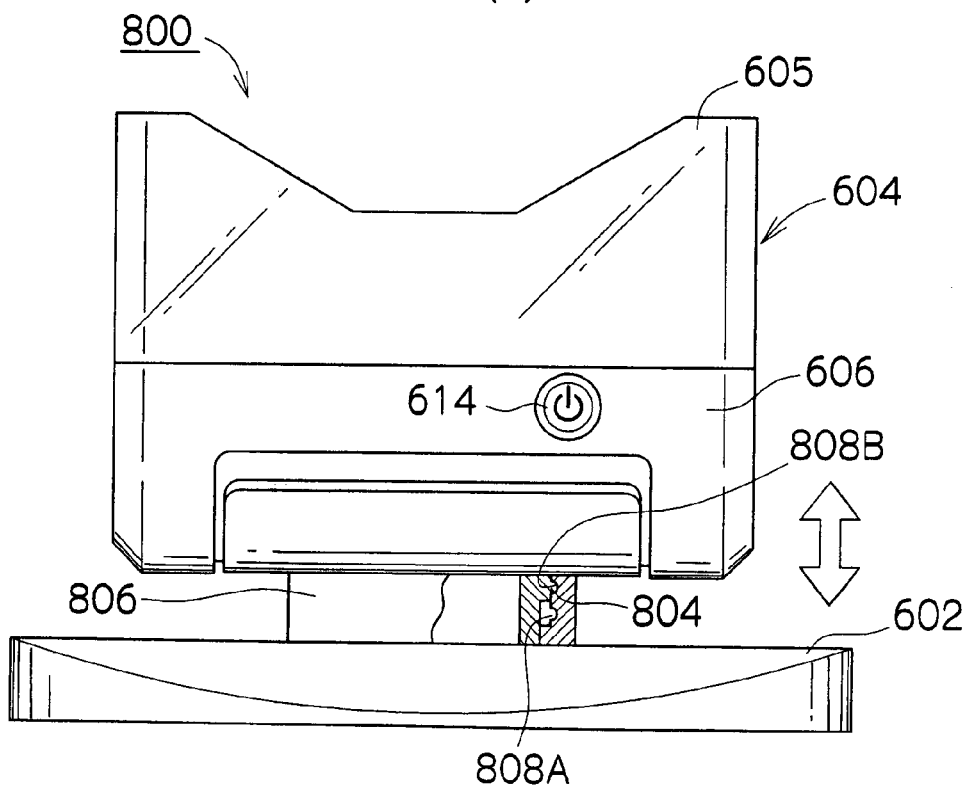

FIGS. 15(a) and 15(b) are front views of a cradle 800 according to the sixth embodiment of the present invention. In FIGS. 15(a) and 15(b), the units commonly appearing in FIGS. 11, 12(a) and 12(b) are assigned the same reference numerals, and the detailed explanation is omitted here. In the cradle 800 shown in FIGS. 15(a) and 15(b), the camera mounting unit 604 is mounted movably in the vertical direction with respect to the leg portion 602.

As shown in the partial sectional view shown in FIGS. 15(a) and 15(b), an engaging projection 804 is formed in a support portion 802 of the leg portion 602, and recesses 808A and 808B in which the projection 804 is engaged are formed in a support receiver 806 of the camera mounting unit 604.

As shown in FIG. 15(a), when the camera mounting unit 604 is lifted from the leg portion 602, the projection 804 is engaged in the lower recess 808A and stopped.

When the camera mounting unit 604 is pushed downward from the state as shown in FIG. 15(a), the pressing force releases the engagement between the projection 804 and the recess 808A, and stopping the projection 804 after engaging it in the recess 808B as shown in FIG. 15(b).

A signal is generated according to the status of each stop position shown in FIGS. 15(a) and 15(b), and is transmitted to the digital camera 510, thereby automatically changing the mode of the digital camera 510.

The structure of the vertical movement is not limited to the expansion system shown in FIGS. 15(a) and 15(b), but any appropriate systems can be used.

In FIGS. 15(a) and 15(b), the upper and lower two stage system is exemplified, but a multiple stage system having three or more stages can be realized.

Furthermore, as other embodiments of the present invention, combinations of different moving systems such as a tilting system for changing a tilt angle, a sliding system, a rotation system, a vertical movement system, etc. can be used.

In the above-mentioned embodiments, the structures of the cradle having variable postures, directions, or positions of the digital camera are described. These structures excel in immediately checking the setting status (mode) of the digital camera by checking the posture, direction, or position of the digital camera, that is, the appearance of the digital camera. As other embodiments of the present invention, structures of displacing a movable portion of the cradle without changing the posture, direction, or position of the digital camera mounted on the cradle can be used.

As described above, according to the present invention, when the movable portion of the cradle is moved with the digital camera mounted on the cradle, a command signal can be generated according to the position of the movable portion, and the operation mode (that is, the function) of the digital camera can be switched according to the command signal. Thus, laborious setting operations are eliminated, and the operability can be improved.

According to the present invention, the functions of the digital camera can be switched for the external equipment according to the tilt angle or the direction of the digital camera mounted on the cradle. Thus, laborious setting operations are eliminated, and the operability can be improved. Additionally, according to the tilt angle of the digital camera mounted on the cradle, the current settings can be immediately checked.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera system in which a digital camera is connected to communicate with external equipment when the camera is removably mounted on a cradle, wherein the cradle comprises:
   a tilt angle changing device which changes a tilt angle of the digital camera mounted on the cradle;
   a determination device which determines a change in the tilt angle of the digital camera by the tilt angle changing device; and
   a command device which outputs a function change signal to the digital camera according to a determination result of the determination device,
   wherein the digital camera changes functions for the external equipment according to the function change signal received from the command device, and
   said system further comprising a charge control device which, when the digital camera is removably mounted on the cradle with the digital camera being powered down, automatically sets a charge mode where a battery in the digital camera is charged by power supplied through the cradle.

2. The digital camera system as defined in claim 1, wherein the functions comprise a camera function and a non-camera function.

3. The digital camera system as defined in claim 2, wherein the camera function comprises a PC camera function and the non-camera function comprises a storage function.

* * * * *